Oct. 17, 1967     A. THUN     3,347,112
LOW BICYCLE PEDAL
Filed June 8, 1965     2 Sheets-Sheet 2
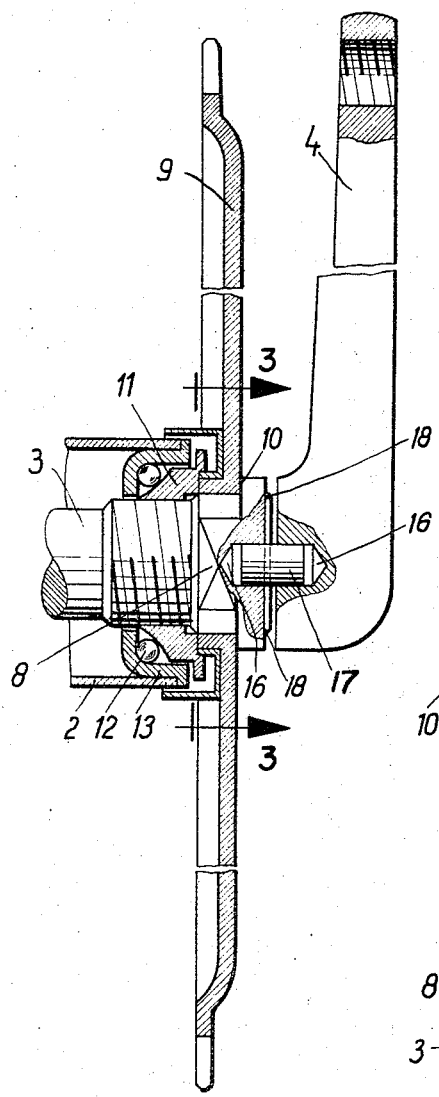
Fig. 2
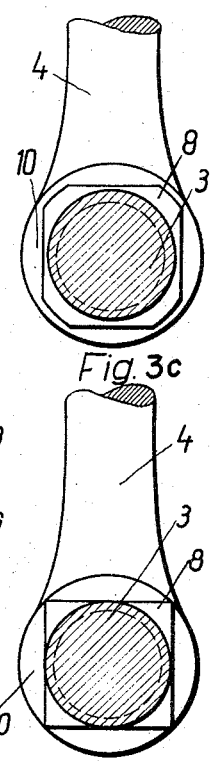
Fig. 3a
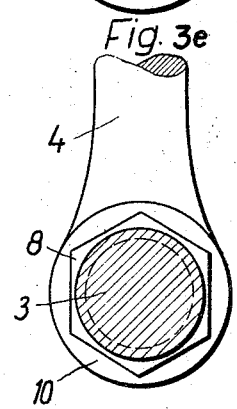
Fig. 3c
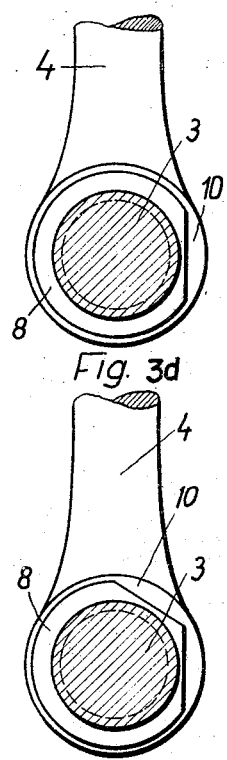
Fig. 3b
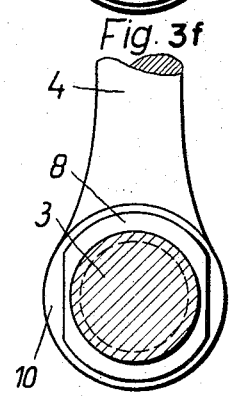
Fig. 3d
Fig. 3e
Fig. 3f
INVENTOR
Alfred Thun
BY *Spencer & Kaye*
ATTORNEYS

3,347,112
LOW BICYCLE PEDAL

Alfred Thun, Ennepetal-Altenvoerde, Germany, assignor to Firma Alfred Thun & Co. GmbH, Ennepetal-Altenvoerde, Germany
Filed June 8, 1965, Ser. No. 462,306
1 Claim. (Cl. 74—594.2)

The present invention relates to a pedal arrangement for bicycles, and more particularly to a novel construction for such pedal arrangements.

Where so-called tapered roller bearings are used to mount pedals in bicycle pedal housing, the individual pedal cranks may sometimes be detachably fastened to the ends of the pedal shaft by means of keys or cotter pins. A sprocket wheel constituting the driving member of the chain drive for the bicycle may be fastened to the crank on the right side of the bicycle. In another conventional arrangement, the so-called Fauberger bearing, the pedal shaft and both cranks are forged as a common element. There are certain disadvantages, however to both these arrangements. The tapered roller bearing includes a large number of small parts, and is therefore prone to failure. The Fauberger bearing, while less susceptible to breakdown, requires an overly large bearing housing and ball bearings in order to properly mount the pedal shaft and the cranks, since the latter are formed as a single unit. This arrangement is consequently relatively heavy, and it has the further drawback that the production of the shaft and cranks as a single unit is relatively difficult, and requires special large machines.

It is also known to forge the pedal shaft and one crank as a single unitary element. However, as mentioned above with respect to the Fauberger bearing, a relatively high expenditure in terms of machines, tools and labor is required for this method.

It is therefore an object of the present invention to provide a pedal arrangement for bicycles which is free of the disadvantages of the above-mentioned prior art, and which is sturdy, lightweight, durable, serviceable and economical to produce and assemble.

It is a further object of the instant invention to provide a pedal arrangement wherein one pedal crank is permanently bonded to the pedal shaft.

These objects as well as others are achieved according to the invention, wherein the pedal arrangement is provided which is mountable within a housing provided on a bicycle, and which includes a pedal shaft rotatably mountable within the housing and having one end extending out of the housing so that a pedal crank may be mounted on it, a pedal crank positioned at the other end of the shaft and extending at right angles thereto, said pedal crank constituting a separate element from said shaft, and means forming a thermal bond, such as a weld or a solder joint, permanently securing said pedal crank to the shaft.

Additional objects and advantages of the present invention will become apparent upon consideration of the following description when taken in conjunction with the accompanying drawings in which:

FIGURE 2 shows, in partial longitudinal cross section, part of a different embodiment of a pedal arrangement according to the invention.

FIGURES 3a through 3f are cross-sectional views taken through the line 3—3 in FIGURE 2 and illustrating different embodiments of the invention.

Figure 1:
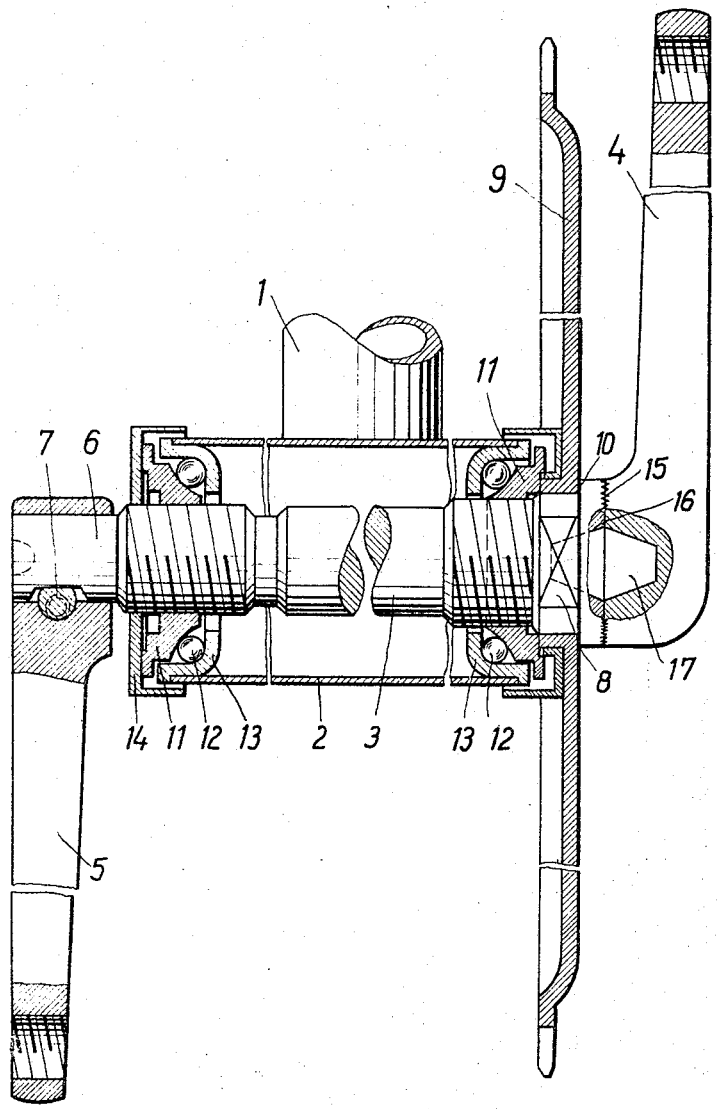
FIGURE 1 shows, in partial longitudinal cross section, a pedal arrangement for bicycles according to the present invention.

Referring to the drawings, FIGURE 1 shows a pedal housing 2 supported by a bicycle frame 1. A pedal shaft 3 is rotatably mounted on two spaced ball bearings 11 within the housing. The pedal shaft is permanently bonded to one of the pedal cranks 4, while the other crank 5 is mounted on the free end 6 of the shaft 3, which end extends out of the housing 2. It may be fastened to shaft 3 by a cotter key 7. Moreover, a sprocket wheel 9 is non-rotatably mounted on a mounting segment 8 of the shaft, which segment may have a polygonal cross section. Alternatively, this section may, for example, be splined. The sprocket wheel 9 abuts one side of a shoulder 10 of the pedal shaft 3 provided adjacent the mounting section 8. The sprocket wheel is pressed against the shoulder 10 by an inner ring 11 which is part of the ball bearing and which threadedly engages the pedal shaft 3. The ball bearing further includes an outer ring 13 within which balls 12 are distributed. The outer ring 13 is provided with a flange by means of which it engages the end of the housing 2. A second ball bearing is similarly situated on the left-hand side of the housing 2, and is threadedly engaged with the shaft 3, where it is held by a nut 14.

The pedal crank 4 is permanently bonded to the shaft 3 by a fusion weld, indicated as 15 in FIGURE 1. In the abutting surfaces of the crank 4 and the shaft 3, coaxial conical blind holes 16 are provided into which a doubly tapering bolt 17 may be put. By engaging both of the blind holes as the crank is pressed toward the shaft, and thus aligning them, this arrangement eliminates the need for excessively large welding machines. The bolt 17 insures proper alignment of the crank and the shaft.

FIGURE 2 illustrates a pedal shaft 3 and a crank 4 which are to be fastened to each other by a resistance weld. For this purpose, an annular plateau 18 formed of the same material as the shaft 3 is provided on the surface of the shaft which abuts the crank 4. This plateau is partially melted during the resistance welding process and partially pressed into the crank 4, since the two elements being welded are forced against each other during the welding process. A bolt 17 is shown in suitable engagement with the blind holes 16, which are formed so as to be coaxial when the two elements being welded are properly positioned with respect to each other.

FIGURES 3a through 3f illustrate different embodiments of the mounting segment 8 upon which a sprocket wheel 9 may be mounted. The shapes shown are merely illustrative of those that may be used; any shape which non-rotatably locks the shaft 3 to the sprocket wheel 9, which is provided with a mating interior mounting surface, may be used.

As has been described, therefore, with respect to an advantageous embodiment of the present invention, a premanufactured pedal shaft is permanently joined to a premanufactured pedal crank, preferably that on the same end of the shaft as the sprocket wheel is to be mounted, by fusion welding, or by resistance welding, or even by soldering. A pedal arrangement is thus obtained which combines ease of assembly with a high degree of mechanical strength, so that it is substantially non-deformable and highly durable, especially due to the permanent bond formed between the shaft and one crank.

As has further been seen, assembly of the arrangement is facilitated by providing the pedal shaft and the crank to be welded to it with corresponding centering means, such as a bolt or pin which mates with blind holes in the abutting surfaces of the two parts to be joined, which holes are coaxially disposed when the two parts are properly aligned. This forces the shaft and the crank into proper alignment for the welding process.

A further feature of the invention, described above, lies in the provision of a mounting, or bearing segment, provided integrally with the shaft 3 and having a cross section which is at least in part polygonal, and upon which a sprocket wheel may be non-rotatably mounted.

The sprocket wheel has a mounting hole which conforms to the mounting segment, and is held in position upon such segment between an abutting shoulder on the shaft 3 and the inner ring of the adjacent ball bearing, which is threadedly engaged on the shaft. This provides an extremely firm mounting between the sprocket wheel and the pedal arrangement.

According to the invention, the pedal arrangement may be assembled by welding or otherwise joining the crank 4 to the pedal shaft 3, first aligning the two elements by placing a pin, or slug, in the blind holes 16 provided therefore and forcing the elements together; then placing the sprocket wheel 9 on the mounting segment 8 adjacent the shoulder 10, and screwing down a ball bearing upon it; mounting the assembly thus formed firmly within the housing 2 by screwing down the other ball bearing on the shaft 3; and finally slipping the remaining pedal crank on the free end 6 of the shaft and fastening it thereto by means of a key.

It will be understood that the above description of the present invention is susceptible to various modifications, changes, and adaptations, and the same are intended to be comprehended within the meaning and range of equivalents of the appended claim.

What is claimed is:

A pedal arrangement for a bicycle, mountable within a housing provided on such bicycle, said arrangement comprising, in combination:
- (a) means forming a pedal shaft rotatably mounted within such housing, one end of said shaft extending out of said housing so that a pedal crank may be mounted upon it;
- (b) a pedal crank positioned at the other end of said shaft, and extending at right angles thereto, said crank constituting a separate element from said shaft;
- (c) centering means provided on corresponding portions of the shaft and crank for aligning them for welding, said centering means including:
  - (1) means forming a blind hole in the surface of the shaft which abuts said crank;
  - (2) means forming a corresponding blind hole in the surface of the crank which abuts the shaft, said blind holes being arranged to be coaxial when the shaft and crank are properly aligned; and
  - (3) means forming a pin extending into both of said blind holes for forcing them into coaxial alignment as they are brought together;
- (d) means forming a thermal bond permanently securing said crank to said shaft, said thermal bond being a weld;
- (e) means forming a mounting segment on said shaft in the region of said bond;
- (f) a sprocket wheel non-rotatably mounted on said mounting segment for driving such bicycle, the corresponding mounting surfaces of said segment and said sprocket wheel having cross sections which are at least partly polygonal;
- (g) a shoulder formed on said shaft adjacent said mounting segment; and
- (h) means threadedly engaged with said shaft for holding the sprocket wheel on the mounting segment against the shoulder.

References Cited

UNITED STATES PATENTS

| | | | |
|---|---|---|---|
| 640,649 | 1/1900 | Gorman | 74—594.2 |
| 648,077 | 4/1900 | Ludlow | 74—594.2 |
| 652,972 | 7/1900 | Lusebrink | 74—594.2 |
| 802,138 | 10/1905 | Byshe | 29—470.5 |
| 1,270,860 | 7/1918 | Newcomb | 219—104 |

FRED C. MATTERN, JR., *Primary Examiner.*

W. S. RATLIFF, *Assistant Examiner.*